(12) United States Patent  
Cheung (10) Patent No.: US 6,922,729 B1  
(45) Date of Patent: Jul. 26, 2005

(54) MULTI-CONNECTION CONTROL SYSTEM

(75) Inventor: Tom Thuan Cheung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,315

(22) Filed: Jul. 30, 1999

(51) Int. Cl.[7] ............................................. G06F 15/16
(52) U.S. Cl. .................. 709/229; 709/217; 709/226; 709/227; 718/104; 718/105; 714/43
(58) Field of Search ................................ 709/229, 225, 709/105, 104, 226, 227, 328, 237, 217; 713/201; 340/5.8, 5.86; 707/8, 200; 711/5, 111, 163, 711/167; 712/220; 710/107, 200; 718/104, 718/105; 714/43; 705/77; 359/118

(56) References Cited

U.S. PATENT DOCUMENTS

| | | | | |
|---|---|---|---|---|
| 4,720,784 A | * | 1/1988 | Radhakrishnan et al. ... | 710/107 |
| 5,394,542 A | * | 2/1995 | Frey et al. .................... | 714/43 |
| 5,444,859 A | * | 8/1995 | Baker et al. ................. | 713/502 |
| 5,495,614 A | * | 2/1996 | Brent et al. .................. | 709/328 |
| 5,526,524 A | * | 6/1996 | Madduri ...................... | 710/200 |
| 5,553,239 A | * | 9/1996 | Heath et al. .................. | 705/77 |
| 5,581,753 A | * | 12/1996 | Terry et al. .................. | 707/201 |
| 5,793,979 A | * | 8/1998 | Lichtman et al. ........... | 709/226 |
| 5,848,271 A | * | 12/1998 | Caruso et al. ............... | 712/220 |
| 5,872,915 A | * | 2/1999 | Dykes et al. ................ | 713/202 |
| 5,881,232 A | * | 3/1999 | Cheng et al. ................. | 707/10 |
| 5,892,905 A | * | 4/1999 | Brandt et al. ................ | 709/202 |
| 5,933,825 A | * | 8/1999 | McClaughry et al. ........... | 707/8 |
| 5,940,865 A | * | 8/1999 | Ohzora et al. ............... | 711/167 |
| 5,978,890 A | * | 11/1999 | Ozawa et al. ................ | 711/163 |
| 6,006,228 A | * | 12/1999 | McCollum et al. ............. | 707/1 |
| 6,044,435 A | * | 3/2000 | Weissmann ................... | 711/111 |
| 6,049,877 A | * | 4/2000 | White ......................... | 713/172 |
| 6,092,201 A | * | 7/2000 | Turnbull et al. ............. | 713/201 |
| 6,115,786 A | * | 9/2000 | Mizutani ..................... | 711/111 |
| 6,125,384 A | * | 9/2000 | Brandt et al. ................ | 709/203 |
| 6,144,990 A | * | 11/2000 | Brandt et al. ................... | 705/8 |
| 6,170,013 B1 | * | 1/2001 | Murata ....................... | 709/229 |
| 6,170,019 B1 | * | 1/2001 | Dresel et al. ............... | 700/108 |
| 6,233,588 B1 | * | 5/2001 | Marchoili et al. ........... | 707/200 |
| 6,233,608 B1 | * | 5/2001 | Laursen et al. ............. | 709/217 |
| 6,253,248 B1 | * | 6/2001 | Nakai et al. ................. | 709/237 |
| 6,282,561 B1 | * | 8/2001 | Jones et al. .................. | 709/104 |
| 6,295,575 B1 | * | 9/2001 | Blumenau et al. ............. | 711/5 |
| 6,304,906 B1 | * | 10/2001 | Bhatti et al. ................ | 709/227 |
| 6,324,580 B1 | * | 11/2001 | Jindal et al. ................ | 709/105 |
| 6,327,622 B1 | * | 12/2001 | Jindal et al. ................ | 709/105 |
| 6,359,711 B1 | * | 3/2002 | Cole et al. ................... | 359/118 |
| 6,408,336 B1 | * | 6/2002 | Schneider et al. ........... | 709/229 |
| 6,578,081 B1 | * | 6/2003 | Tominaga et al. ........... | 709/229 |

* cited by examiner

*Primary Examiner*—Jack B. Harvey
*Assistant Examiner*—Hai V. Nguyen
(74) *Attorney, Agent, or Firm*—Sughrue Mion, PLLC (57) ABSTRACT

The present invention discloses a multi-connection control system. Initially, one or more requests to access a system are received. For each request, it is determined whether to allow access to the system using an access vector to identify an available access object.

24 Claims, 4 Drawing Sheets

MULTI-CONNECTION CONTROL SYSTEM

BACKGROUND OF THE INVENTION

1. Field of the Invention

This invention relates in general to computer systems, and, in particular, to a multi-connection control system.

2. Description of Related Art

Some systems need to access a shared database connected to a server simultaneously with multiple requests. These systems need to access the server expeditiously at more than one time and in such a way that the number of available access permits are not exceeded. That is, these systems may have a limit as to how many users or requests may access the server. However, these systems want to access a server as many times as necessary. For example, one system may be a banking system which is used by many customers to access their account balances simultaneously. In this scenario, the banking system would need to access the server multiple times, once for each customer request. Some conventional systems access the server serially to process each request, which does not provide information to each customer efficiently.

Therefore, there is a need in the art for an improved technique for accessing a server to process multiple requests.

SUMMARY OF THE INVENTION

To overcome the limitations in the prior art described above, and to overcome other limitations that will become apparent upon reading and understanding the present specification, the present invention discloses a method, apparatus, and article of manufacture for a multi-connection control system.

In accordance with the present invention, one or more requests to access a system are received. For each request, it is determined whether to allow access to the system using an access vector to identify an available access object.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by of illustration a specific embodiment in which the invention may be practiced. It is to be understood that other embodiments may be utilized as structural changes may be made without departing from the scope of the present invention.

Hardware Environment

Figure 1:
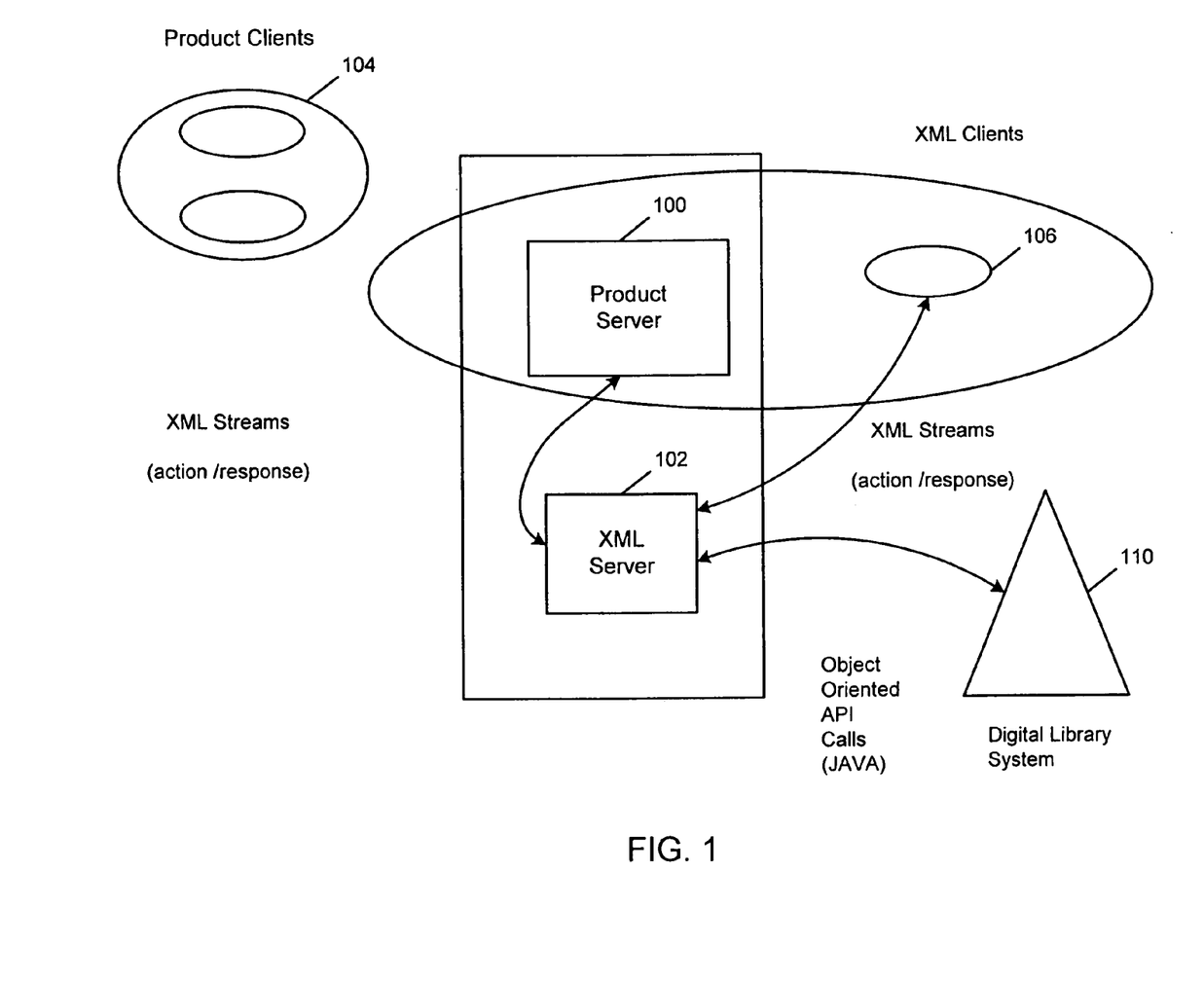
FIG. 1 illustrates a block diagram of a computer hardware environment that could be used in accordance with a preferred embodiment of the present invention.

FIG. 1 illustrates a block diagram of a computer hardware environment that could be used in accordance with a preferred embodiment of the present invention. In particular, FIG. 1 is a block diagram illustrating the interaction of a Product system and the Digital Library system. The Product system is comprised of a Product Server 100 and Product Clients 104. The Product server 100 communicates with the Digital Library system ("Digital Library") 110 via and extensible Markup Language (XML), which enables a user to create documents that contain links to multiple other documents on the Internet. An XML server 102 receives XML commands from the Product server 100 and from other XML clients 106. The XML server 102 processes the XML commands to access data in the Digital Library 110.

The XML server 102 communicates with a Digital Library System 110 via Object Oriented (OO) Application Programming Interface (API) calls (e.g., in the JAVA programming language). The XML server 102 communicates with the Product server 100 and the XML clients 106 via XML streams (i.e., action/response). XML commands that require a Digital Library 110 response (action) are parsed with the necessary parameters and passed to the Digital Library 100. The Digital Library 110 processes the command and returns a response.

In particular, the XML server 102 processes incoming XML action streams from XML clients. The XML server 102 spawns an agent to do the work and return a response XML stream. The XML server 102 also handles Product server 100 transaction requests. Additionally, the XML server 102 identifies requests from the Product server 100 or XML clients 106 to access the Digital Library 110. Additionally, the XML server 102 processes responses received from the Digital Library 110 to determine whether there was success or failure. Moreover, there may be multiple connections to the Digital Library 110. The Digital Library 110, in processing requests received from the XML server 102, modifies Product specific Digital Library tables in conjunction with normal database functions while processing the request.

In one embodiment, the Product server 100 and the Digital Library 110 are connected via the Internet. The Internet is a collection of computer networks that exchange information via Transmission Control Protocol/Internet Protocol ("TCP/IP"). The Internet computer network consists of many internet networks, each of which is a single network that uses the TCP/IP protocol suite. Currently, the use of the Internet computer network for commercial and non-commercial uses is exploding. Via its networks, the Internet computer network enables many users in different locations to access information stored in data sources (e.g., databases) stored in different locations.

The World Wide Web (i.e., the "WWW" or the "Web") is an information and communication system used on the Internet computer network with data communications operating according to a client/server model. Typically, a Web client computer (e.g., a Product client will request data stored in data sources from a Web server computer (e.g., a Product server 100), at which Web server software resides. The Web server software interacts with an interface connected to, for example, the XML server 102, which is connected to the data sources (e.g., the Digital Library 110). Thus, the Product server 100 communicates with the Digital Library 110 through extensible Markup Language (XML) commands that are processed by the XML server 102.

The preferred embodiment improves integration of the Digital Library and a production system in which the Product has its own file storage up to the point of publication of digital media. The Digital Library interface enables archival of file objects via the Digital Library system, enables placement of metadata information in the Digital Library, enables storage and maintenance of data, and enables storage of file objects into the Digital Library. In one embodiment of the invention, the Digital Library interface is implemented in the Java programming language.

The Digital Library architecture is based on a triangular client/server model comprised of a Library Server, one or more multimedia Object Servers, and one or more clients. The core of the infrastructure is the Library Server. The Library Server, using IBM DB2 or Oracle database services, manages the Digital Library catalog information, locates stored objects using a variety of search technologies, provides secured access to the objects held in the collection, and communicates with the Object Servers. The digital content is stored in Object Servers. Object Servers support the attachment of DASD and other media devices, and can be distributed across an enterprise network to provide convenient user access. The end user, on a client desktop, receives direct access to the information requested from the collection regardless of where the data is stored. Many clients can be connected to the Library and Object Server in a Digital Library system, including those accessing the Digital Library using supported Web browsers.

A preferred embodiment of the present invention works in conjunction with a language with the ability to declare static (shared) variables and the ability to synchronize a block of code for entrance by only one thread at a time. Although these can be worked around with variable passing and programming locks, performance and complexity increase with the work arounds. In particular, the static and synchronization types of the Java language are used.

The multi-connection control system of the preferred embodiment of the invention is preferably implemented in one or more computer programs or applications. These computer programs may be part of the Digital Library 110. Generally, the computer programs implementing the techniques of the invention are tangibly embodied in and/or readable from a device, carrier, or media, and/or remote devices coupled to a computer via data communication devices. Those skilled in the art will recognize that the hardware environment illustrated in FIG. 1 is not intended to limit the present invention. Indeed those skilled in the art will recognize that other alternative hardware environments may be used without departing from the scope of the present invention.

A Multi-Connection Control System

In one embodiment of the invention, a multi-connection control system is a connection provider to a server that enables multiple accesses by multiple requests simultaneously. The multi-connection control system uses an accessibility construct, which is described in further detail below. The accessibility construct may be applied to many general accessibility systems such as: badge systems, parking systems, and server systems. The multi-connection control system has a dynamic design that allows growth without having to stop an ongoing system. The multi-connection control system is dynamic in that a computer program in which the techniques of the invention are embodied could be running, and without interrupting the computer program, the number of requests to access the system may be increased.

Additionally, the multi-connection control system allows for dynamically changing the number of users who access the database. This assists in determining access performance. In particular, if the number of users accessing the database is high, some users may wait for other users to finish before they can access the database. Therefore, by dynamically changing the number of users, the multi-connection control system enables access performance to be improved.

The multi-connection control system connects to a server (e.g., Digital Library) N number of times, and the connections are checked out via locks. Thus, the multi-connection control system is an access system that controls access to the server. "Access to server" refers to connecting to the server to initiate requests to the server.

Figure 2:
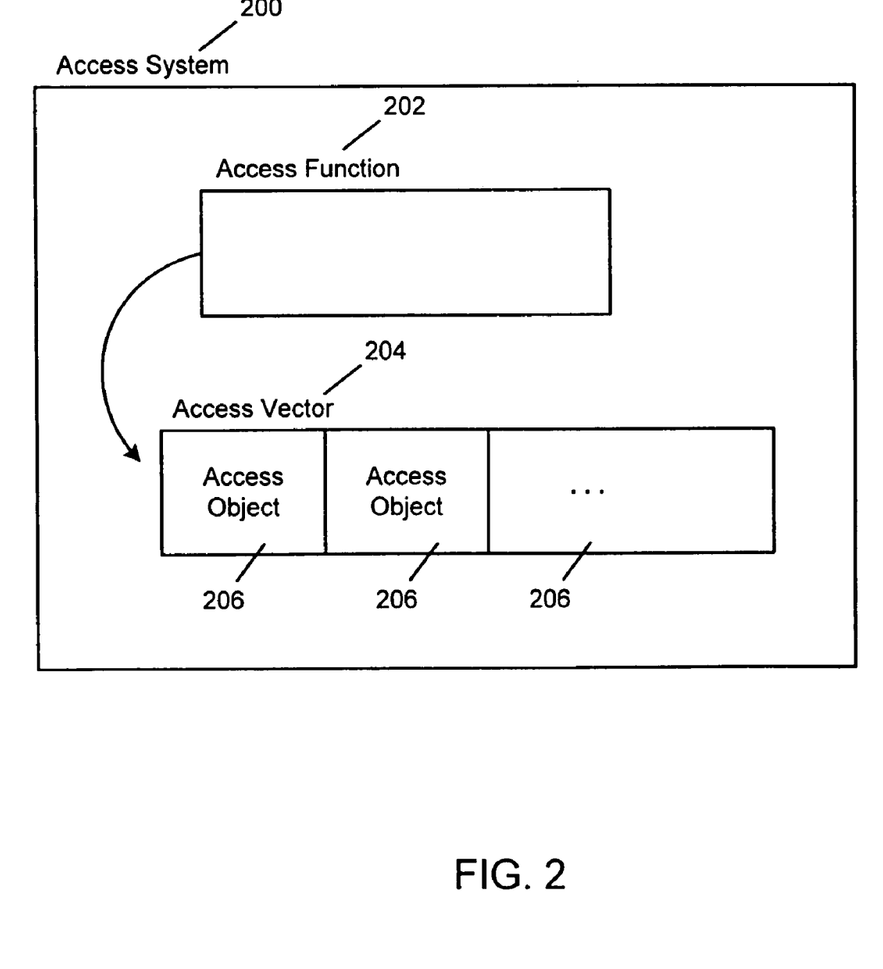
FIG. 2 is a block diagram illustrating the elements of a multi-connection control system.

FIG. 2 is a block diagram illustrating the elements of a multi-connection control system. The multi-connection control system is an access system 200. The access system 200 includes an access function 202 that determines whether access is to be provided. The access function 202 makes its determination using an access vector 204. The access vector is an array of access objects 206. Each of these elements will be described in further detail below.

The access vector 204 is a dynamic array object that consists of objects, referred to as access objects 206. The access objects 206 are specified based on the access system 200. For example, in a badge system in which a badge is required to enter a set of rooms, the badge is the access object. The access object 206 consists of enough information (i.e., attributes) to determine valid access (i.e., whether a request is authorized) and other access rights. The access vector 204 controls the uniqueness of the access and is stored in a shared memory storage for use by multiple requests.

An access function 202 is used to manipulate the access vector 204 to determine whether or not access is available. If access is available, the access system 200 returns the necessary confirmation to the request, otherwise, the access system 200 returns a predetermined "no access" value. The use of static (shared) variables and the ability to synchronize a block of code for entrance by only one thread at a time is the key to allowing multi-threaded invocation of the access function 202.

The following is an example of psuedocode defining an Access System:

```
Access System                              // an access system object such
{                                          // as a server connection
                                           // manager
   Access Object                           // access object
   {
      long Id;                             // access information
      int AccessLevel;                     // specific to access system
      ...
      long getId( );                       // get and set routines
      int getAccessLevel( );
      ...
   }
   static Vector AccessVector (of Access Object);   // access Vector
                                                    // to store shared
                                                    // access objects
   Object static synchronized AccessFunction( );
   {
      look up AccessVector( ) for available access  // can use
                                                    // predetermined
                                                    // logic here
      if (access available)
      {
         set Availability return values
      }
      else
      {
```

```
        set unAvailability return values
    }
        return returnObject;
    }
}
```

In the above example, the Access System is comprised of an Access Object, an Access Vector, and an Access Function. The Access System may be a server connection manager, which is part of a server.

The Access Object includes an identifier (i.e., Id, which is a long integer) used to provide access information and an access level indicator (i.e., AccessLevel, which is an integer) used to provide specific information for the access system. In addition to this data, the Access Object includes get and set routines to get and set the identifier and access level (e.g., the getId and getAccessLevel routines).

The Access Vector is an array of Access Objects that are shared among multiple users of one system or among multiple systems.

The Access Function contains logic for determining whether to give access to a request. In particular, the Access Function includes logic for looking up the AccessVector to determine whether access is available. Additionally, the Access Function returns an object (i.e., returnObject) that contains Availability return values when access is available and contains unAvailability return values when access is not available.

Although the above example discussed objects, one skilled in the art would recognize that the techniques of the multi-connection control system could be applied to other implementations, including a functional implementation that is developed with parameter passing and dynamic allocation of the Access Vector.

Figure 3:
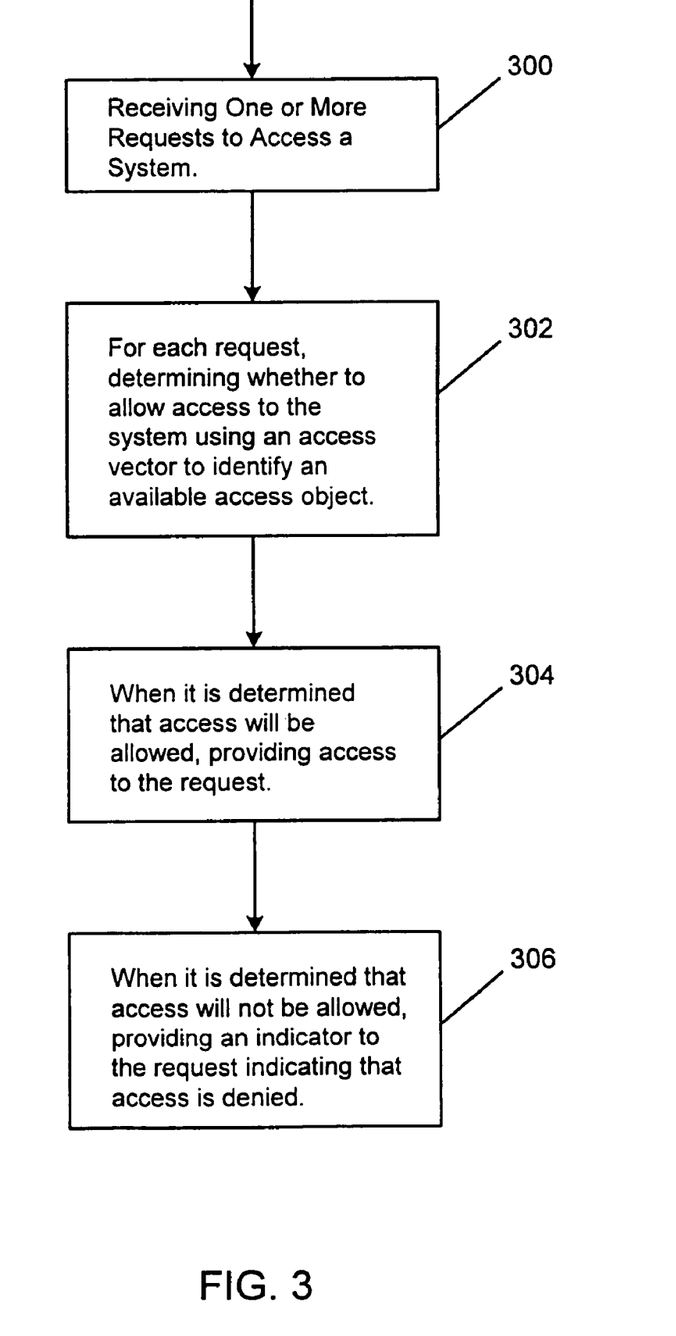
FIG. 3 is a flow diagram illustrating the steps performed by a multi-connection control system to process a request.

FIG. 3 is a flow diagram illustrating the steps performed by a multi-connection control system to process a request. In block 300, the multi-connection control system receives one or more requests to access a system. In block 302, the multi-connection control system, for each request, determines whether to allow access to the system using an access vector to identify an available access object. When it is determined that access will be allowed, in block 304, the multi-connection control system provides access to the request. When it is determined that access will not be allowed, in block 306, the multi-connection control system provides an indicator to the request indicating that access is denied.

Figure 4:
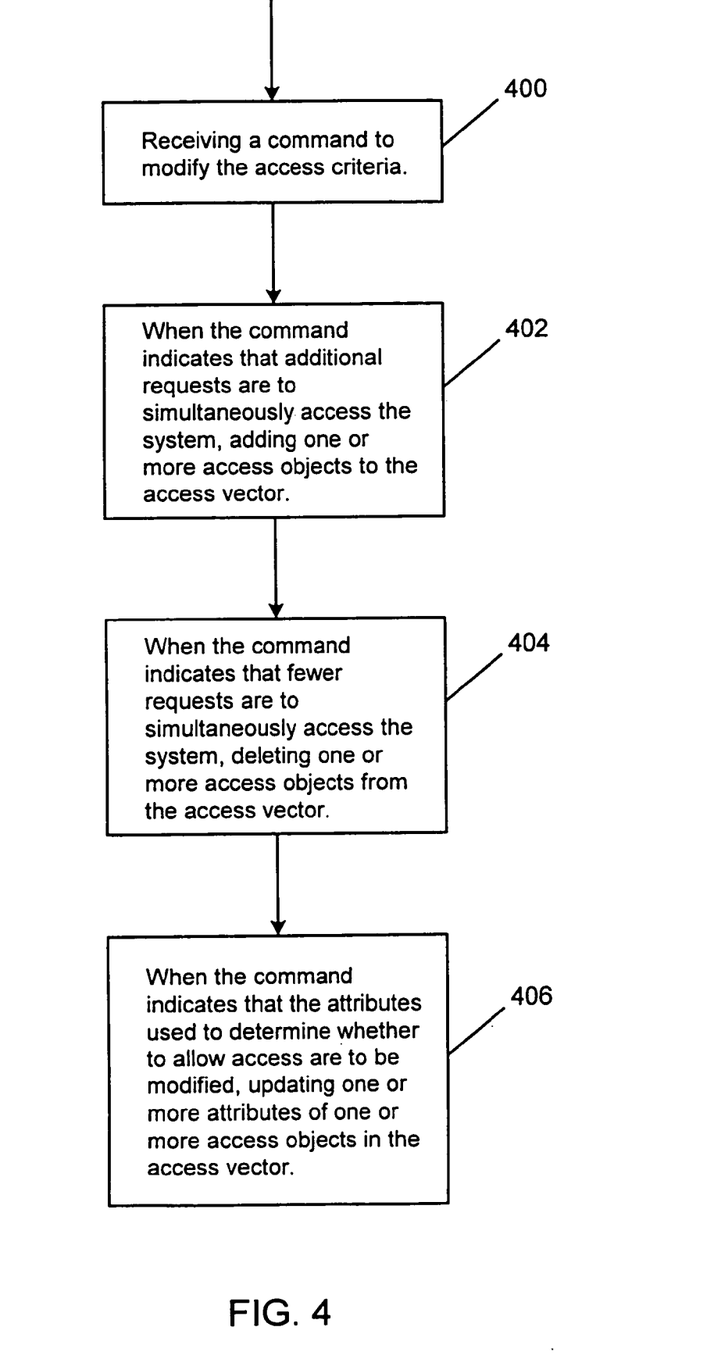
FIG. 4 is a flow diagram illustrating the steps performed by a multi-connection control system to process changes to access criteria.

New Access Objects can be added to the Access Vector to allow more requests to access the server without stopping the Access System. Additionally, some Access Objects can be removed from the Access System or updated in the Access System, without stopping the execution of the Access System. For example, a request may be denied access either because the access limit (i.e., the number of requests that can simultaneously access the system) has been reached or the access level of the request does not allow the request to obtain the information that it wants. In this case, the user submitting the request may request a system administrator to increase the number of requests that can access the Access System or may request that the access level (i.e., an attribute of an access object) be changed to allow the request to have greater access to, for example, tables stored at a server. Once the administrator increases the number of requests or updates the access level of the particular request, the request can access the Access System. In a similar manner, the number of requests that can simultaneously access the system may be decreased. FIG. 4 is a flow diagram illustrating the steps performed by a multi-connection control system to process changes to access criteria. In block 400, the multi-connection control system receives a command to modify the access criteria. When the command indicates that additional requests are to simultaneously access the system, in block 402, the multi-connection control system adds one or more access objects to the access vector. When the command indicates that fewer requests are to simultaneously access the system, in block 404, the multi-connection control system deletes one or more access objects from the access vector. When the command indicates that the attributes used to determine whether to allow access are to be modified, the multi-connection control system updates one or more attributes of one or more access objects in the access vector.

The logic that is to be applied to determine whether access is available is easily fitted into the Access Function. This allows for a more general technique that enables different Access Systems, with varying characteristics, to have different Access Functions.

Moreover, separation of the access logic from an overall complex system reduces the complexity of the system. Also, the Access System restricts access to an Access Function, which minimizes the amount of information a request "needs to know" of the overall system. That is, a request may input its request without understanding the logic of the Access Function.

One of the advantages of the multi-connection control system is that it provides synchronization. That is, the access function is being synchronized among multiple requests or even multiple systems (each with multiple requests). To maintain this synchronization, the access vector is manipulated by one thread at a time. Thus, the access vector is locked and cannot be accessed by others while one thread is manipulating the access vector.

EXAMPLES

In a preferred embodiment of the invention, the techniques of the invention are used to provide improved integration between a Digital Library System ("the Digital Library"), from International Business Machines Corporation, and a Product that accesses the Digital Library.

The Digital Library is an advanced database for storing digital image files. This digital media may be text, full-motion video, audio, graphics, or images. The Digital Library enables petabytes of text, images, audio and video, to be created or transformed into digital form, stored in the Digital Library, and distributed over any network, with security, to users around the world. The Digital Library provides management and reuse of media assets, preserves assets from physical deterioration, protects assets with advanced rights management, and consolidates management of text, images, audio and video.

The Product may be any system that may use the Digital Library. For example, the Product may comprise a product for a banking system, for a media production group, for print and Web publishers, or for researchers and teachers. The Digital Library provides media asset (i.e., digital media) solutions with sufficient storage capacity, scalability, speed, multi-level security, sophisticated searching techniques and Internet access to reach new markets, preserve assets from loss or deterioration, and ensure copyright protection.

The following is an example that applies the techniques of the embodiment of the invention to the Digital Library and a XML server. In particular, for the Digital Library system 110, the XML server 102 submits multiple requests to the Digital Library 110. For each request, the Digital Library 110 executes the access function to determine whether to provide access to that request. The access function uses the access vector to determine whether any access objects are available. If an access object is available, the access function provides access to the request. Otherwise, the access function provides an error message or other indication to the request to indicate that the request cannot receive access to the Digital Library.

In yet another example, the access system is a parking lot. The access object is a parking space and contains the details about that parking space, for example, that parking space might be associated with a parking space identifier, with a size (i.e., compact), and with other details (e.g., handicapped parking space). One access factor is the sum of all of the parking spaces (i.e., access can only be give to as many cars as there are spaces for). The access vector is an array of the access objects (i.e., the parking spaces), and the access vector indicates for each access object, whether that access object is available (i.e., whether the parking space is available). The access function determines whether to let a car enter the parking lot. Lets assume that the parking structure contains only 100 spaces. If the 100 spaces are taken, then the access function at the parking lot entry denies access to the parking lot. Additionally, the access function processes exits by updating the access vector to indicate that parking spaces are available.

When cars enter the parking lot, each one has a badge, which is a special ID. This is part of the access function. When the ID is submitted to a badge reader, it becomes input to the access function. The ID provides information, such as defining the type of access a car has and the type of parking space that it can park in (e.g., compact). Then, the access function determines whether the car has the appropriate access type to park in the parking lot. Additionally, the access function determines whether the appropriate parking space is available (e.g., handicapped). The access vector is a list of the access objects that are available. Therefore, the access function checks the access vector to determine whether there is a parking space available. If the access function determines that a parking space is available, the access function allows the car to enter, otherwise, the access function indicates that the car must wait for an available parking space.

The access function also determines whether cars are exiting the parking lot. When a car exits, this information is input to the access function, which recognizes that an access object is free. At this time, the access function enables the waiting car to enter (assuming that the parking space is appropriate for that car).

Additionally, when new parking spaces are added, this translates to additional access objects. Typically, this is done by executing an add function to increase the number of access objects. This add function is executed to modify the access system while the access system is being used. Thus, the access system simulates the real time without having to shut down.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with embodiments of the present invention.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this description, but rather by the claims appended hereto.

What is claimed is:

1. A method of determining access to a system supporting a plurality of simultaneous accesses, the method comprising the steps of:
   receiving a request to access the system,
   determining whether to allow access to the system using an access vector comprising a plurality of access objects, each access object corresponding to one of the simultaneous accesses,
   allowing access to the system only when at least one of the access objects is available, and
   if access to the system is allowed based on an available access object, changing the available access object to an unavailable access object for the duration of the access,
   wherein the number of simultaneous accesses permitted is modifiable by changing a number of access objects in the access vector without halting operation of the system.

2. The method of claim 1, wherein each access object comprises information regarding attributes of the access object.

3. The method of claim 2, wherein the step of determining further comprises the step of evaluating whether the request can be satisfied with an available access object based on one or more attributes of that access object.

4. The method of claim 1, further comprising the step of returning a result to the request.

5. The method of claim 1, further comprising the step of modifying the access vector upon receiving an indication that a request has completed its access to the system.

6. The method of claim 1, wherein the number of access objects in the access vector is increased.

7. The method of claim 1, wherein the number of access objects in the access vector is decreased.

8. The method of claim 1, further comprising the step of modifying one or more attributes of an access object.

9. An apparatus for determining access to a system supporting a plurality of simultaneous accesses, comprising:
   a computer,
   one or more computer programs, executed by the computer, for:
   receiving a request to access the system,
   determining whether to allow access to the system using an access vector comprising a plurality of access objects, each access object corresponding to one of the simultaneous accesses,
   allowing access to the system only when at least one of the access objects is available, and
   if access to the system is allowed based on an available access object, changing the available access object to an unavailable access object for the duration of the access, and means for modifying the number of simultaneous accesses permitted by changing a number of access objects in the access vector without halting operation of the system.

10. The apparatus of claim 9, wherein each access object comprises information regarding attributes of the access object.

11. The apparatus of claim 10, wherein determining whether to allow access to the system using an access vector further comprises evaluating whether the request can be satisfied with an available access object based on one or more attributes of that access object.

12. The apparatus of claim 9, further comprising means for returning a result to the request.

13. The apparatus of claim 9, further comprising means for modifying the access vector upon receiving an indication that a request has completed its access to the system.

14. The apparatus of claim 9, wherein the number of access objects in the access vector is increased.

15. The apparatus of claim 9, wherein the number of access objects in the access vector is decreased.

16. The apparatus of claim 9, further comprising means for modifying one or more attributes of an access object.

17. An article of manufacture comprising a computer program carrier readable by a computer and tangibly embodying one or more instructions executable by the computer to perform method steps for determining access to a system supporting a plurality of simultaneous accesses, the method comprising the steps of:

receiving a request to access the system;

determining whether to allow access to the system using an access vector comprising a plurality of access objects, each access object corresponding to one of the simultaneous accesses, allowing access to the system only when at least one of the access objects is available, and if access to the system is allowed based on an available access object, changing the available access object to an unavailable access object for the duration of the access, wherein the number of simultaneous accesses permitted is modifiable by changing a number of access objects in the access vector without halting operation of the system.

18. The article of manufacture of claim 17, wherein each access object comprises information regarding attributes of the access object.

19. The article of manufacture of claim 18, wherein the step of determining further comprises the step of evaluating whether the request can be satisfied with an available access object based on one or more attributes of that access object.

20. The article of manufacture of claim 17, further comprising the step of returning a result to the request.

21. The article of manufacture of claim 17, further comprising the step of modifying the access vector upon receiving an indication that a request has completed its access to the system.

22. The article of manufacture of claim 17, wherein the number of access objects in the access vector is increased.

23. The article of manufacture of claim 17, wherein the number of access objects in the access vector is decreased.

24. The article of manufacture of claim 17, further comprising the step of modifying one or more attributes of an access object.

* * * * *

UNITED STATES PATENT AND TRADEMARK OFFICE
CERTIFICATE OF CORRECTION

PATENT NO.    : 6,922,729 B1
DATED         : July 26, 2005
INVENTOR(S)   : Tom Thuan Cheung It is certified that error appears in the above-identified patent and that said Letters Patent is hereby corrected as shown below:

Column 8,
Lines 18 and 57, "system," should read -- system; --.
Line 54, "computer," should read -- computer; --.
Line 61, "accesses," should read -- accesses; --.
Line 63, "available," should read -- available; --.

Signed and Sealed this

Twenty-fourth Day of January, 2006

JON W. DUDAS
*Director of the United States Patent and Trademark Office*